United States Patent [19]

Hmida et al.

[11] Patent Number: 4,985,862
[45] Date of Patent: Jan. 15, 1991

[54] BINARY ADDER CIRCUIT WITH IMPROVED INPUTS

[75] Inventors: Hedi Hmida, Paris; Pierre Duhamel, Issy Les Moulineaux, both of France

[73] Assignee: ETAT Francais represente par le Ministre Delegue des Postes et Telecommunications (Centre National D'Etudes Des Telecommunications), Issy Les Moulineaux, France

[21] Appl. No.: 248,089

[22] Filed: Sep. 23, 1988

[30] Foreign Application Priority Data

Sep. 23, 1987 [FR] France ............................ 87 13146

[51] Int. Cl.⁵ ............................................. G06F 7/50
[52] U.S. Cl. ................................................. 364/786
[58] Field of Search ............................ 364/784–786

[56] References Cited

U.S. PATENT DOCUMENTS

| | | | |
|---|---|---|---|
| 3,767,906 | 10/1973 | Pryor | 364/786 |
| 4,439,835 | 3/1984 | Best et al. | 364/786 |
| 4,707,800 | 11/1987 | Montrone et al. | 364/788 |
| 4,831,578 | 5/1989 | Bui | 364/784 |

FOREIGN PATENT DOCUMENTS

| | | |
|---|---|---|
| 0096333 | 12/1983 | European Pat. Off. |
| 0143456 | 6/1985 | European Pat. Off. |
| 0185504 | 6/1986 | European Pat. Off. |

OTHER PUBLICATIONS

"Principles of CMOS VLSI Design" by N. H. E. West and Kamran Eshraghian, published by Addison–Wesley Publishing Company, pp. 317–319.

Proceedings of the IEEE International Conference on Computer Design: VLSI Computers, New York, Oct. 7–10, 1985, "Carry–Save Adders and Their Application for a Multiplication with Factored Multiplicands", by S. Steinlechner et al., pp. 359–362.

Patent Abstracts of Japan. vol. 9, No. 140, Logical Circuit, Masafumi Yamaguchi, Jun. 14, 1985.

International Journal of Mini & Microcomputers, "Bit Serial Techniques in VLSI Parallel Processing", by D. I. Moldovan et al., vol. 7, No. 2, 1985, pp. 49–52.

Primary Examiner—Dale M. Shaw
Assistant Examiner—Long T. Nguyen
Attorney, Agent, or Firm—Foley & Lardner, Schwartz, Jeffery, Schwaab, Mack, Blumenthal & Evans

[57] ABSTRACT

A binary calculation circuit has a logic operator acting as an exclusive-OR gate generating a first intermediate signal which is an exclusive-OR of a first input and a carry-in input. An inverter generates a second intermediate signal. A second logic operator generates a first output bit which is a symmetrical exclusive-OR of a second input and both the first and second intermediate signals. A second output bit is a symmetrical trigger function of the first and second input, depending on the first and second intermediate signals, and is generated in a transmission gate. Since the carry-in signal passed via the first and second intermediate signals is applied directly to transistors of the transmission gate, carry propagation delay is reduced.

6 Claims, 6 Drawing Sheets

BINARY ADDER CIRCUIT WITH IMPROVED INPUTS

The invention relates to calculations on binary digits, i.e. bits. It is applicable to realizing binary electronic systems such as adders, multipliers, dividers, accumulators, ... .

BACKGROUND OF THE INVENTION

The document "Proceedings of the IEEE International Conference on Computer Design: VLSI in Computers", New York, Oct. 7–10, 1985, pp. 359–362; S. Steinlechner, and our prior French Pat. application No. 87 03758 filed Mar. 18, 1987 (and our corresponding U.S. Pat. application No. 167787, describe a binary calculation circuit of the type comprising at least one cell having:

a 1-bit first input for receiving a first input signal (Ai);

a 1-bit second input for receiving a second input signal (Bi);

a 1-bit carry-in input for receiving a carry-in signal (Ri-1 S);

first means for generating an exclusive-OR signal (Ai⊕Bi) and its complement $(\overline{Ai \oplus Bi})$ from the first and second input signals;

second means for producing a result signal by performing an exclusive-OR function between the carry-in signal (Ri-1 S) said exclusive-OR signal (Ai⊕Bi);

third means for producing a carry-out signal (Ri S) by performing a transmission function by means of two transmission gates controlled by said exclusive-OR signal (Ai⊕Bi) and its complement $(\overline{Ai \oplus Bi})$, with one of the gates passing the carry-in signal (Ri-1 S) and the other gate passing one or other of the two input signals (Ai, Bi).

In the embodiments described in the earlier patent application, the carry-in signal (Ri-1 S) is applied to the drains of the transistors equipping the transmission gates under the control of said exclusive-OR signal (Ai⊕Bi) and its complement $(\overline{Ai \oplus Bi})$. This gives rise to a loss of time during calculation of the carry-out signal (Ri S) and consequently to a loss of carry propagation time in circuits comprising a plurality of cells in parallel organized as adder and/or subtracter modules with propagated carry.

The Applicants have now observed that by interchanging the roles of the second input signal (Bi) and the carry-in signal (Ri-1 S), and by using the intermediate variables thus obtained by said interchange for calculating the carry-out signal (Ri S), the carry propagation delay in such parallel-connected cells is considerably reduced. The carry-in signal (Ri-1 S) passing via the exclusive-OR signal (Ai⊕Ri-1 S) is now applied directly to the grids of the transistors in the transmission gates which are controlled by said exclusive-OR signal (Ai⊕Ri-1 S) and its complement $(\overline{Ai \oplus Ri-1\ S})$.

SUMMARY OF THE INVENTION

More precisely, the present invention provides a binary calculation circuit of the type comprising at least one cell having:

a 1-bit first input for receiving a first input signal (Ai);

a 1-bit second input for receiving a second input signal (Bi); and a 1-bit carry-in input for receiving a carry-in signal (Ri-1 S);

comprising:

first means for generating an exclusive-OR signal (Ai⊕Ri-1 S) between the first input signal and the carry-in signal, and the complement thereof $(\overline{Ai \oplus Ri-1\ S})$, said complement $(\overline{Ai \oplus Ri-1\ S})$ being produced by inverting the signal (Ai⊕Ri-1 S);

second means for producing a result signal by performing an exclusive-OR function between the second input signal (Bi) and said exclusive-OR signal (Ai⊕Ri-1 S) between the first input signal and the carry-in signal; and third means for producing a carry-out signal (Ri S) by means of a transmission function comprising two transmission gates controlled by said exclusive-OR signal (Ai⊕Ri-1 S) between the first input signal and the carry-in signal, and the complement thereof $(\overline{Ai \oplus Ri-1\ S})$, with one of the gates passing the first input signal (Ai) and with the other gate passing the second input signal (Bi).

In a preferred embodiment of the invention, the first, second, and third means are connected in the same manner as the first, second, and third means respectively as claimed in any of the claims of our above-mentioned earlier patent application, with the 1-bit second input (Bi) and the 1-bit carry-in input (Ri-1 S) being interchanged.

The invention also provides a binary calculation circuit of the type comprising at least one basic cell for adding a first bit (Ai) of arbitrary binary value taken from a variable operand (A) and a second bit (Bi) whose binary value is fixed and known taken from a fixed operand (B), wherein each cell comprises a first module for delivering an exclusive-OR signal (Ai⊕Ri-1 S) between the first input signal and the carry-in signal, and a second module for producing a carry-out signal (Ri S) by performing a transmission function comprising two transmission gates under the control of the carry-in signal (Ri-1 S) and its complement $(\overline{RI-1\ S})$, with one of the gates passing the first input signal (Ai) and with the other gate passing the second input signal (Bi).

In a preferred embodiment, the binary calculation circuit according to the invention comprises a plurality of cells in which the carry-out signal (RiS) from each cell of rank (i) (0<i<n−2) is connected to the 1-bit carry-in input (RiS) of the cell of rank i+1. Advantageously, each cell is hard-wired with the value of the bit (Bi) of the fixed operand B.

More particularly, the first module of each cell which is associated with a bit (Bi) of logic value "0" of the fixed operand (B) comprises three pairs of transistors as follows: a first pair of opposite polarity transistors comprising a first transistor and a second transistor, with the grids of both transistors in the first pair being connected to receive the carry-in signal (Ri-1 S), with a positive electric voltage (V) being applied to the drain of the first transistor, with ground being applied to the source of the second transistor, and with the source of the first transistor and the drain of the second transistor being interconnected at a first node;

a second pair of opposite polarity transistors, comprising a first transistor and a second transistor, with the drain of the first transistor being connected to receive the carry-in signal (Ri-1 S), with the source of the second transistor being connected to the first node, with the grids of both transistors being connected to receive the first input signal (Ai) from the variable operand (A), and with the source of the first transistor and the drain of the second transistor being interconnected at a second node; and a third pair of opposite polarity transistors, comprising a first transistor and a second transistor, with the sources of both transistors being connected to the second node, with the drains of both transistors being connected to receive the first input signal (Ai) from the variable operand (A), with the grid of the first transistor being connected to receive the carry-in signal (Ri-1 S), and with the grid of the second transistor being connected to the first node, such that said exclusive-OR signal (Ai⊕Ri-1 S) between the bits of the variable operand (A) and the carry-in signal is obtained at the second node.

According to another aspect of the invention, the second module of each cell associated with a bit (Bi) of logic value "0" in the fixed operand (B) comprises:

a fourth pair of opposite polarity transistors, comprising a first transistor and a second transistor, with the grid of the first transistor being connected to receive the carry-in signal (Ri-1 S), with the grid of the second transistor being connected to receive the complemented carry-in signal ($\overline{\text{Ri-1 S}}$), with the drains of both transistors being connected to receive the first input signal (Ai) from the variable operand (A), and with the sources of both transistors being connected to a third node; and a single third transistor which is an N-channel transistor with its source connected to ground, with its grid controlled by the complemented carry-in signal ($\overline{\text{Ri-1 S}}$), and with its drain connected to the third node, the carry-out signal (Ri S) being obtained at the third node interconnecting the sources of both transistors in the fourth pair with the drain of the third transistor.

According to another aspect of the invention, the first module of each cell associated with a bit (Bi) of logic value "1" of the fixed operand (B) comprises three pairs of transistors as follows:

a first pair of opposite polarity transistors comprising a first transistor and a second transistor, with the grids of both transistors in the first pair being connected to receive the carry-in signal (Ri-1 S), with a positive electric voltage (V) being applied to the drain of the first transistor, with ground being applied to the source of the second transistor, and with the source of the first transistor and the drain of the second transistor being interconnected at a first node;

a second pair of opposite polarity transistors, comprising a first transistor and a second transistor, with the drain of the first transistor being connected to the first node, with the source of the second transistor being connected to receive the carry-in signal (Ri-1 S), with the grids of both transistors being connected to receive the first input signal (Ai) from the variable operand (A), and with the source of the first transistor and the drain of the second transistor being interconnected at a second node; and a third pair of opposite polarity transistors, comprising a first transistor and a second transistor, with the sources of both transistors being connected to the second node, with the drains of both transistors being connected to receive the first input signal (Ai) from the variable operand (A), with the grid of the first transistor being connected to the first node, and with the grid of the second transistor being connected to the carry-in input (Ri-1 S), such that the exclusive-OR signal (Ai⊕Ri-1 S) between the bits of the variable operand (A) and the carry-in signal is obtained at the second node.

According to yet another aspect of the invention, the second module of each cell associated with a bit (Bi) of logic value "1" in the fixed operand (B) comprises:

a fourth pair of opposite polarity transistors, comprising a first transistor and a second transistor, with the grid of the first transistor being connected to receive the carry-in signal (Ri-1 S), with the grid of the second transistor being connected to receive the complemented carry-in signal ($\overline{\text{Ri-1 S}}$), with the drains of both transistors being connected to receive the first input signal (Ai) from the variable operand (A), and with the sources of both transistors being connected to a third node; and a single third transistor which is a P-channel transistor with its source connected to a positive electric voltage (V), with its grid controlled by the complemented carry-in signal ($\overline{\text{Ri-1 S}}$), and with its drain connected to the third node, the carry-out signal (Ri S) being obtained at the third node interconnecting the sources of both transistors in the fourth pair with the drain of the third transistor.

The invention may also be applied to a parallel-series binary multiplier for multiplying a fixed operand B comprising n bits Bn−1, Bn−2, ..., B0 by a variable n-bit operand D of arbitrary value having bits Dn−1, Dn−2, ..., D0, said multiplier including an accumulator and shift register for storing a partial result of the multiplication, said register including an input and an output.

A particular multiplier of this type is described in French patent application number 86 13222.

According to another characteristic of the present invention, the multiplier further includes:

a binary calculation circuit as described above including and output and an input connected to the output of the register, each cell of said binary calculation circuit including a first module for delivering an exclusive-OR signal (Di⊕Ri-1 S) and a second module for producing a carry-out signal (Ri S); and a two-input multiply having one of its inputs connected to the output from the binary calculation circuit and having its other input connected to the output from the register, and having an output connected to the input of the register, said multiplexer also including a control input to which the variable operand D is applied in serial form.

In a variant embodiment, for the purpose of multiplying two opposite-sign operands, the multiplier further includes a second multiplexer disposed between the output from the accumulator and shift register and the input to the adder, said second multiplexer having two inputs, one connected to the output from the register and the other connected to the output of an inverter whose input is connected to the output from the register, said second multiplexer being controlled by the most significant bit Dn−1 of the operand D.

BRIEF DESCRIPTION OF THE DRAWINGS

Embodiments of the invention are described by way of example with reference to the accompanying drawings, in which.

In numerous respects, the accompanying drawings include information which is definitive in nature. Consequently, they may be used not only for facilitating understanding of the following detailed description, but also for contributing to the definition of the invention, where appropriate.

MORE DETAILED DESCRIPTION

Figure 1:
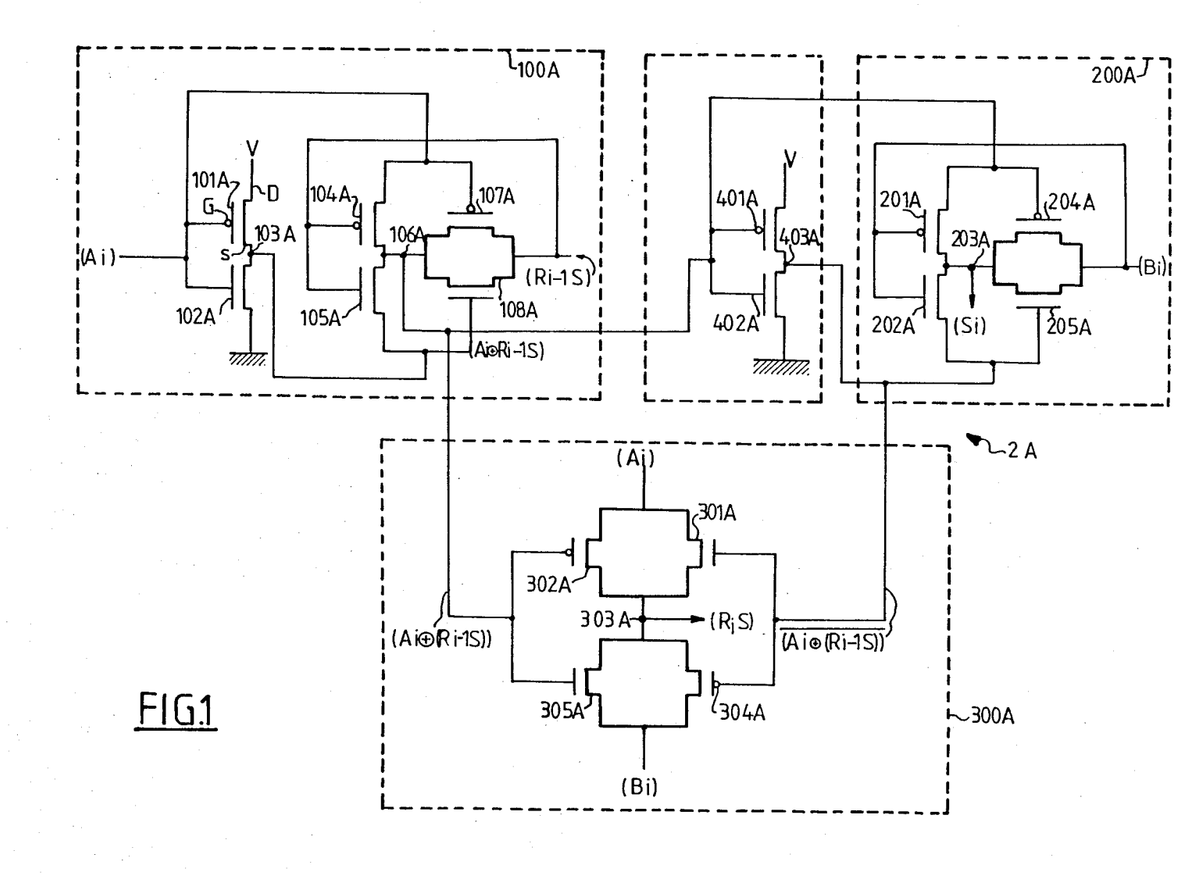
FIG. 1 is a circuit diagram of the essential component parts of a full adder in accordance with the invention having three 1-bit inputs (Ai, Bi, and Ri-1 S) and comprising 16 transistors.

In FIG. 1, reference 2A designates a full adder in accordance with the invention having three 1-bit inputs and comprising 16 transistors.

Figure 2:
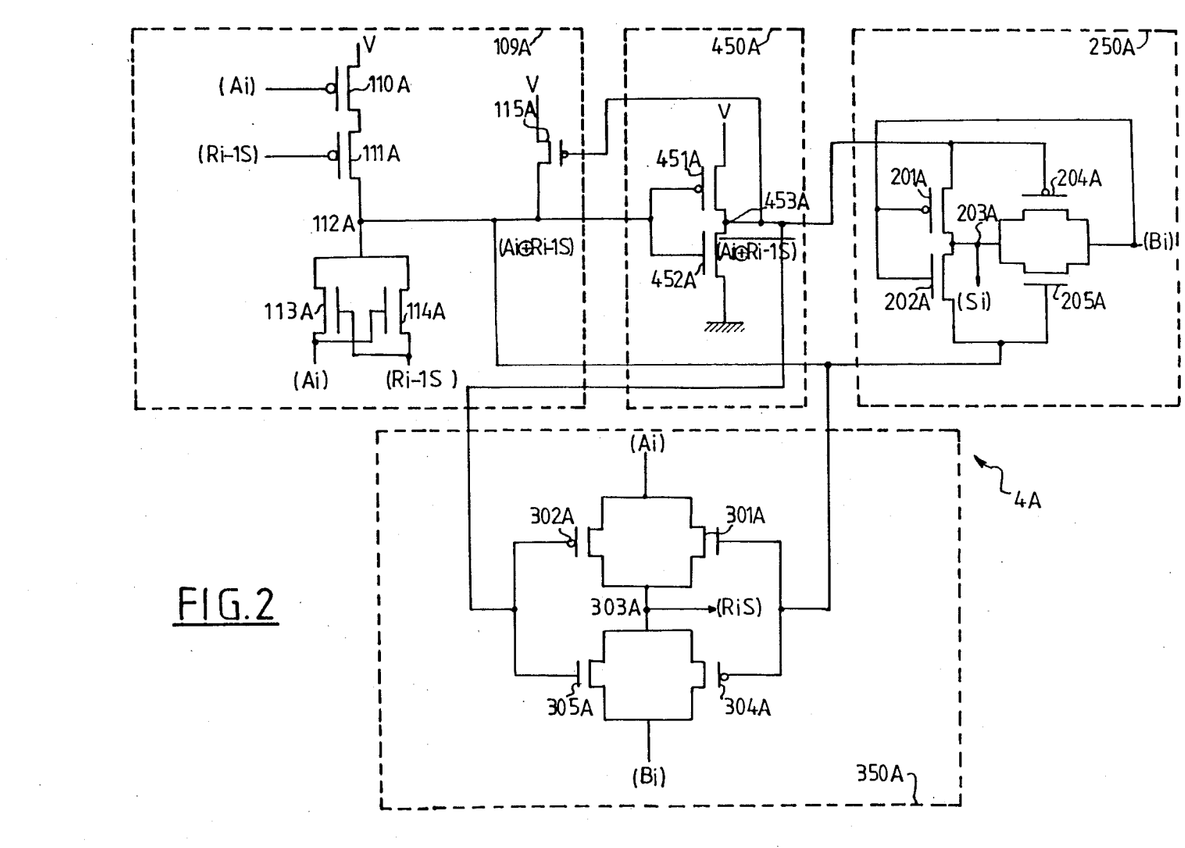
FIG. 2 is a circuit diagram of the essential component parts of a full adder in accordance with the invention having three 1-bit inputs (Ai, Bi, and Ri-1 S) and comprising 15 transistors.

The addition cell 2A shown in FIG. 1 is practically identical to the addition cell 2 shown in FIG. 2 of our above-mentioned prior patent application. It differs solely in that the second 1-bit input (Bi) has been interchanged with the 1-bit carry-in input (Ri-1 S), and in that the letter A has been added to the references of the essential component parts of adder 2A in accordance with the present invention.

The adder 2A includes a 1-bit first input (Ai), a 1-bit second input (Bi), and a 1-bit carry-in input (Ri-1 S). The adder 2A produces a 1-bit result signal (Si). The result is the sum of the two bits (Ai, Bi) and the carry-in bit (Ri-1 S). It is obtained by calculating the module sum, also known as the exclusive-OR sum, of the first bit (Ai), the second bit (Bi), and the carry-in bit (Ri-1 S).

The adder 2A produces a 1-bit carry-out signal (Ri S) which is associated with the result of calculating the sum (Si) of the three input signals (Ai, Bi, and Ri-1 S). The carry-out signal (Ri S) is obtained by calculating the sum of: the product of the two input bits; the product of one of the input bits (Ai) and the carry-in bit (Ri-1 S), and the product of the other input bit (Bi) and the carry-in bit (Ri-1 S).

In order to obtain these two signals, the adder 2A comprises first means 100A for generating an exclusive-OR signal (Ai⊕Ri-1 S) between a first one of the input signals (Ai) and the carry-in signal. These first means 100A comprise a pair of complementary MOS technology transistors 101A and 102A. Transistor 101A is a P-channel device and transistor 102A is an N-channel device. The grids of both transistors 101A and 102A are connected to the first bit input (Ai). An electric voltage V is applied to the drain D of transistor 101A. For example, when the transistors are MOS technology devices, the value of V may be 5 volts. Ground is connected to the source S of transistor 102A. The source of transistor 101A and the drain of transistor 102A are interconnected at a node 103A. The first means 100A also include a second pair of complementary MOS technology transistors 104A and 105A. Transistor 104A is P-channel and transistor 105A is N-channel. The drain of transistor 104 is connected to the 1-bit first input (Ai) and the source of transistor 105A is connected to the node 103A. The grids of the transistors 104A and 105A are connected to the 1-bit carry-in input (Ri-1 S). The source of transistor 104A and the drain of transistor 105A are interconnected at a node 106A.

The first means 100A further include a third pair of complementary transistors 107A and 108A. Transistor 107A is P-channel and transistor 108A is N-channel. The sources of transistors 107A and 108A are connected to the node 106A. The drains of transistors 107A and 108A are connected to the 1-bit carry-in input (Ri-1 S). The grid of transistor 107A is connected to the 1-bit first input (Ai) and the grid of transistor 108A is connected to the node 103A. The exclusive-OR signal (Ai⊕Ri-1 S) between the first input signal and the carry-in signal is obtained at the node 106A.

The first means 100A operate as follows:

When the first input signal (Ai) is at a positive voltage V corresponding to a high logic state, transistor 101A is OFF, whereas transistor 102A is ON. In this configuration, a zero voltage, corresponding to a low logic state, is obtained at the node 103A.

When the first input signal (Ai) is at a zero voltage, transistor 101A is ON, whereas transistor 102A is OFF. In this case, a positive electric voltage is obtained at the node 103A. The pair of transistors 101A and 102A acts as an inverter on the first input signal (Ai).

When the first bit signal (Ai) is in the high logic state, the complemented signal (Ai) is in the low logic state. The pair of transistors 104A and 105A also acts as an inverter, thus causing the complemented signal $\overline{(Ri-1\ S)}$ appear at node 106A. The transmission gate constituted by the pair of transistors 107A and 108A is open.

When the first input signal (Ai) is in the low logic state, the complemented signal (Ai) is in the high logic state. The transmission gate constituted by the pair of transistors 107A and 108A is now closed, thus causing the carry-in signal (Ri-1 S) to pass to the node 106A. The pair of transistors 104A and 105A is inactive. As a result, the signal at node 106A is the exclusive-OR signal (Ai⊕Ri-1 S) between the first input signal and the carry-in signal.

The adder then comprises a pair 400A of opposite polarity transistors 401A and 402A. This pair inverts said exclusive-OR signal (Ai⊕Ri-1 S) between the first input signal and the carry-in signal. The transistor pair 400A comprises a P-channel transistor 401A and an N-channel transistor 402A. The grids of the transistors 401A and 402A are connected to receive the exclusive-OR signal (Ai⊕Ri-1 S) between the first input signal and the carry-in signal. An electric voltage V is applied to the drain of transistor 401A. When using MOS technology transistors, V has a value of 5 volts, for example. Ground is applied to the source of transistor 402A. The complemented exclusive-OR signal $\overline{(Ai\oplus Ri-1\ S)}$ between the first input signal and the carry-in signal is obtained at node 403A connecting the source of transistor 401A to the drain of transistor 402A. The pair of transistors 401A and 402A operates in the same way as the above-described pair of transistors 101A and 102A.

The adder 2A then comprises second means 200A for producing a result signal (Si) by performing the exclusive-OR function between the second input signal (Bi) and said exclusive-OR signal ($\overline{Ai \oplus Ri\text{-}1\ S}$) between the first input signal and the carry-in signal and with the complement thereof ($\overline{Ai \oplus Ri\text{-}1\ S}$). These second means 200A comprise two pairs of opposite polarity transistors. The first pair is constituted by transistors 201A and 202A. Transistor 201A is P-channel and transistor 202A is N-channel. The grids of the transistor 201A and 202A are connected to the 1-bit second input (Bi). The drain of transistor 201A is connected to receive the exclusive-OR signal ($\overline{Ai \oplus Ri\text{-}1\ S}$) between the first input signal and the carry-in signal. The source of transistor 201A is connected to the complemented exclusive-OR signal between the first input bit and the carry-in signal. The result signal (Si) is obtained at a node 203A connecting the source of transistor 201A to the drain of transistor 202A.

The second pair is constituted by transistors 204A and 205A. Transistor 204A is P-channel and transistor 205A is N-channel. The drains of both transistors 204A and 205A are connected to the 1-bit second input (Bi). The grid of transistor 204A is connected to receive said exclusive-OR signal ($Ai \oplus Ri\text{-}1\ S$) between the first input signal and the carry-in signal. The grid of transistor 205A is connected to the complemented exclusive-OR signal ($\overline{Ai \oplus Ri\text{-}1\ S}$) between the first input signal and the carry-in signal. The result signal (Si) is obtained from the node 203A interconnecting the sources of the transistors 204A and 205A.

The second means 200A operate as follows:

When said exclusive-OR signal ($Ai \oplus Ri\text{-}1\ S$) between the first input signal and the carry-in signal is in the high logic state, the complemented signal ($\overline{Ai \oplus Ri\text{-}1\ S}$) is in the low logic state. The pair of transistors 201A and 202A acts as an inverter causing the complemented signal (Bi) to appear at node 203A. The transmission gate constituted by the pair of transistors 204A and 205A is open.

When said exclusive-OR signal ($Ai \oplus Ri\text{-}1\ S$) between the first input signal and the carry-in signal is in the low logic state, the complemented signal ($\overline{Ai \oplus Ri\text{-}1\ S}$) is in the high logic state. The transmission gate constituted by the pair of transistors 204A and 205A is now closed, thus causing the second signal (Bi) to appear at node 203A. The pair of transistors 201A and 202A is inactive.

Finally, the adder includes third means 300A for producing a carry-out signal (Ri S) by means of a transmission function comprising two transmission gates under the control of said exclusive-OR signal ($Ai \oplus Ri\text{-}1\ S$) between the first input signal and the carry-in signal and under the control of its complement, with one of the gates passing the first input signal (Ai) and with the other gate passing the second input signal (Bi).

The third means 300A comprise two pairs of opposite polarity transistors. The first pair is constituted by transistors 301A and S02A. Transistor 301A is N-channel and transistor 302A is P-channel. The grid of transistor 301A is connected to receive the complemented exclusive-OR signal ($\overline{Ai \oplus Ri\text{-}1\ S}$) between the first input signal and the carry-in signal. The grid of transistor 302A is connected to the exclusive-OR signal ($Ai \oplus Ri\text{-}1\ S$) between the first input signal and the carry-in signal. The drains of transistors 301A and 302A are connected to the 1-bit first input (Ai). The carry-out signal (Ri S) is obtained at the node 303A interconnecting the sources of transistors 301A and 302A. The second pair is constituted by transistors 304A and 305A. Transistor 304A is P-channel and transistor 305A is N-channel. The grid of transistor 304A is connected to receive the complement of the exclusive-OR signal between the first input signal and the carry-in signal. The grid of transistor 305A is connected to receive the exclusive-OR signal ($\overline{Ai \oplus Ri\text{-}1\ S}$) between the first input signal and the carry-in signal. The sources of both transistors 304A and 305A are connected to the 1-bit second input (Bi). The carry-out signal (Ri S) is obtained at the node 303A which interconnects the drains of transistors 304A and 305A.

The third means 300A operate as follows:

When the exclusive-OR signal ($Ai \oplus Ri\text{-}1\ S$) between the first input signal and the carry-in signal is in the low logic state, the complemented signal ($\overline{Ai \oplus Ri\text{-}1\ S}$) is in the high state. The transmission gate constituted by the transistors 301A and 302A is closed causing the signal (Ai) to appear at node 303A. The transmission gate constituted by the pair of transistors 304A and 305A is inactive.

When the exclusive-OR signal ($Ai \oplus Ri\text{-}1\ S$) between the first input signal and the carry-in signal is in the high logic state, the complemented signal ($\overline{Ai \oplus Ri\text{-}1\ S}$) is in the low state. The transmission gate constituted by transistors 304A and 305A is now closed, causing the second input signal (Bi) to appear at node 303A. The pair of transistors 301A and 302A is inactive.

It will be observed that in the above-described 16-transistor adder 2A, the grids of transistors 301A, 302A, 304A, and 305A now have the carry-in signal (Ri-1 S) applied thereto (or more precisely the exclusive-OR signal ($Ai \oplus Ri\text{-}1\ S$) and its complement ($\overline{Ai \oplus Ri\text{-}1\ S}$) between the first input signal and the carry-in signal). This structure thus serves to accelerate carry propagation through a binary calculation circuit in accordance with the invention and comprising a plurality of addition cells as described with reference to FIG. 1, with the carry-out signal (Ri S) from each cell of rank (i) ($0 < i < n-2$) being connected to the carry-in input (Ri S) of the cell of rank (i+1).

Reference is now made to FIG. 2 which is a circuit diagram of a full adder in accordance with the invention having three 1-bit inputs and comprising 15 transistors.

Figure 3:
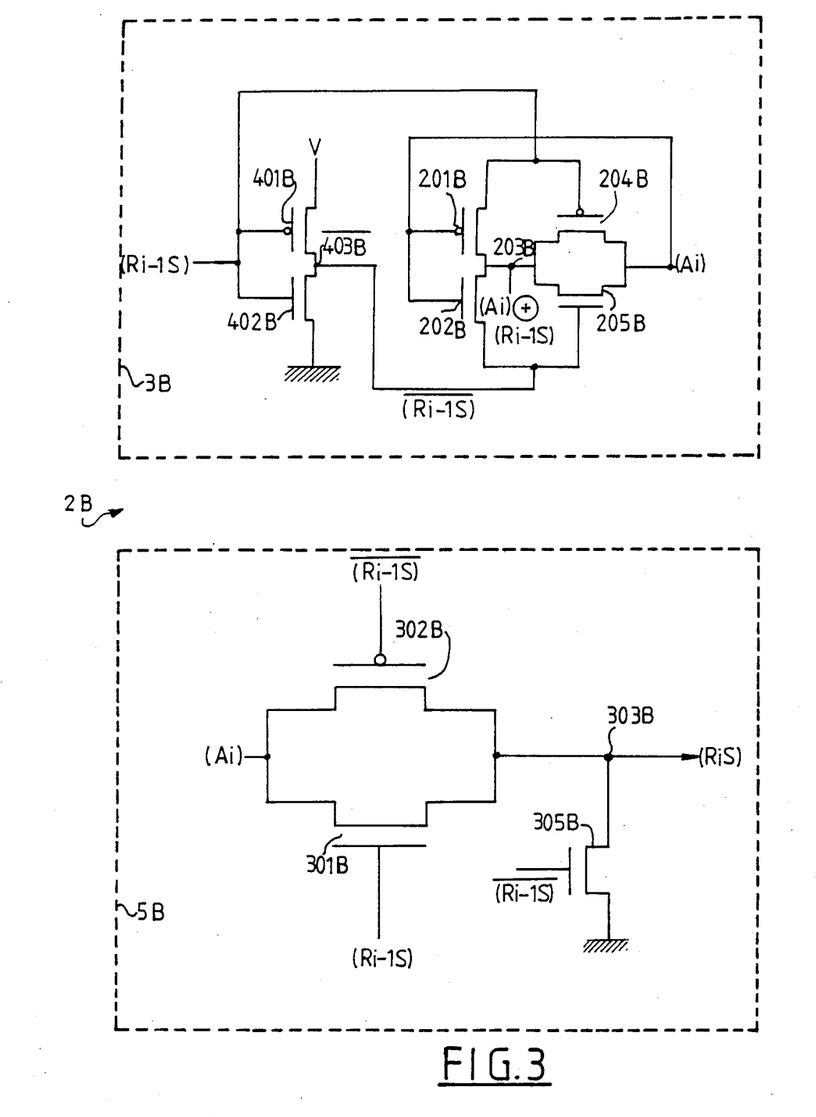
FIG. 3 is a circuit diagram of two modules of an addition cell in accordance with the invention for adding a bit (Ai) of arbitrary binary value to a bit of logic value "0"

The addition cell 4A shown in FIG. 2 is practically identical to the addition cell 4 shown in FIG. 3 of our above-mentioned earlier patent application. It differs solely in that the 1-bit second input (Bi) is interchanged with the 1-bit carry-in input (Ri-1 S), and in that the letter A is added to the references of the essential component parts of adder 4A in accordance with the present invention.

In order to obtain an adder 4A comprising only 15 transistors, the first means 100A of adder 2A as described with reference to FIG. 1 are modified. The other means 250A, 350A, and the pair 450A of the adder 4A are respectively identical to the means 200A, 300A, and 400A of adder 2A described with reference to FIG. 1.

The first means 109A of adder 4A comprise a pair of P-channel transistors 110A and 111A. The grid of transistor 110A is connected to the 1-bit first input (Ai) and the grid of transistor 111A is connected to the 1-bit carry-in input (Ri-1 S). An electrical voltage V is applied to the drain of transistor 110A. When using MOS technology transistors, V may have a value of 5 volts, for example. The source of transistor 110A is connected to the drain of transistor 111A. The source of transistor 111A is connected to a node 112A.

The first means 109A of adder 4A comprise a further pair of transistors constituted by an N-channel transistor 113A and an N-channel transistor 114A. The source of transistor 113A is connected to the 1-bit first input (Ai). The grid of transistor 113A is connected to the 1-bit carry-in input (Ri-1S). The source of transistor 114A is connected to the carry-in input (Ri-1 S). The grid of transistor 114A is connected to the first bit input (Ai). The complemented exclusive-OR signal $(\overline{Ai \oplus Ri\text{-}1\ S})$ between the first input bit and the carry-in signal is obtained at node 112A connecting the source of transistor 113A to the drain of transistor 114A.

The first means 109A of adder 4A finally include a single P-channel transistor 115A. The source of transistor 115A is connected to node 112A. An electric voltage V is applied to the drain of transistor 115A. The grid of transistor 115A is connected to node 453A of the pair 450A constituted by transistors 451A and 452A identical to the pair 400A of transistors 401A and 402A described with reference to FIG. 1. The function of transistor 115A is to put the complement $(\overline{Ai \oplus Ri\text{-}1\ S})$ via node 112A to the high logic state when the transistor 115A is activated, i.e. when the signal $(Ai \oplus Ri\text{-}1\ S)$ applied to the grid of transistor 115A is in the low logic state.

Naturally, interchanging the 1-bit second input (Bi) with the 1-bit carry-in input (Ri-1 S) for the purpose of accelerating carry propagation in successive cells may be performed in various propagated carry binary calculation circuits such as the adders and subtracters described in our prior application.

The adders 2A and 4A as described above constitute a first type of embodiment of the invention. Some of the means of these adders may advantageously be used for constituting a binary calculation circuit of the type including at least one basic cell for adding a first bit (Ai) from a first, variable operand A of arbitrary binary value with a second bit (Bi) from a second, fixed operand B whose binary value is known.

Naturally, the specific value of the fixed operand determines the structure of each cell of a binary calculation circuit for adding a fixed operand of known value with an operand of arbitrary value. Thus, in a binary calculation circuit in accordance with the invention, there are two types of cell: cells associated with a fixed operand bit having logic value "0"; and cells associated with a fixed operand bit having logic value "1".

Reference is now made to FIG. 3 which shows one cell of a binary calculation circuit associated with a fixed operand of logic value "0". Advantageously, the cell 2B is derived from the cell 2A described with reference to FIG. 1 by omitting the means 100A and one of the transistors in the means 300A, by modifying the inputs, and by adding a B to the references of the essential component parts of the cell 2B in accordance with the invention.

The cell 2B comprises a first module 3B for delivering the exclusive-OR signal $(Ai \oplus Ri\text{-}1\ S)$ between the first input signal and the carry-in signal, and a second module 4B for producing the carry-out signal (Ri S) by means of a transmission function comprising two transmission gates controlled by the carry-in signal (Ri-1 S) and its complement $(\overline{Ri\text{-}1\ S})$, with one of the gates passing the variable input signal (Ai) and the other gate passing the fixed operand bit of logic value "0".

The first module 3B comprises a pair of transistors 401B and 402B which are respectively P-channel and N-channel. The grids of both transistors 401B and 402B are connected to the 1-bit carry-in input (Ri-1 S). A positive electric voltage V is applied to the drain of transistor 401B, and ground is applied to the source of transistor 402B. The source of transistor 401B and the drain of transistor 402B are interconnected at a node 403B. The module 3B includes a further pair of transistors 201B and 202B which are respectively P-channel and N-channel. channel. The drain of transistor 201B is connected to the 1-bit carry-in input (Ri-1 S) and the source of transistor 202B is connected to node 403B. The grids of both transistors 201B and 202B are connected to the 1-bit first input (Ai) from the variable operand A. The source of transistor 201B and the drain of transistor 202B are interconnected at another node 203B. The module 3B also includes a pair of transistors 204B and 205B which are respectively P-channel and N-channel. The sources of both transistors 204B and 205B are connected to said other node 203B. The drains of both transistors 204B and 205B are connected to receive the first input signal (Ai) from the variable operand A. The grid of transistor 204B is connected to the 1-bit carry-in input (Ri-1 S) and the grid of transistor 205B is connected to one of the nodes 403B. The exclusive-OR signal $(Ai \oplus Ri\text{-}1\ S)$ between the first input signal of the operand A and the carry-in signal is obtained at node 203B. Module 3B operates identically to the means 400A and 200A described with reference to FIG. 1.

The second module 5B of cell 2B associated with a "0" logic value bit (Bi) from the fixed operand B comprises a pair of transistors 301B and 302B which are respectively N-channel and P-channel. The grid of transistor 301B is connected to receive the carry-in signal (Ri-1 S), and the grid of transistor 302B is connected to receive the complemented carry-in signal $(\overline{Ri\text{-}1\ S})$. The drains of both transistors 301B and 302B are connected to receive the first input signal (Ai) from the variable operand A. The sources of both transistors 301B and 302B are connected to a node 303B. The second module 5B includes a further N-channel transistor 305B whose source is connected to ground, whose grid is controlled by the complemented carry-in signal $(\overline{Ri\text{-}1\ S})$, and whose drain is connected to node 303B. The carry-out signal (Ri S) is obtained at node 303B interconnecting the drain of transistor 305B and the sources of the transistors 301B and 302B.

The module 5B operates as follows. When the carry-in signal (Ri-1 S) is in the high logic state, the complemented carry-in signal $(\overline{Ri\text{-}1\ S})$ is in the low state. The transmission gate constituted by the transistors 301B and 302B is closed, causing the first input signal (Ai) to appear at node 303B. The transmission gate constituted by transistor 305B is inactive. When the carry-in signal (Ri-1 S) is in the low logic state, the complemented signal $(\overline{Ri\text{-}1\ S})$ is in the high state. The transmission gate constituted by the transistor 305B is now closed, causing the ground signal, i.e. the second input signal (Bi) of logic value "0" to appear at node 303B. The pair of transistors 301B and 302B is inactive.

Figure 4:
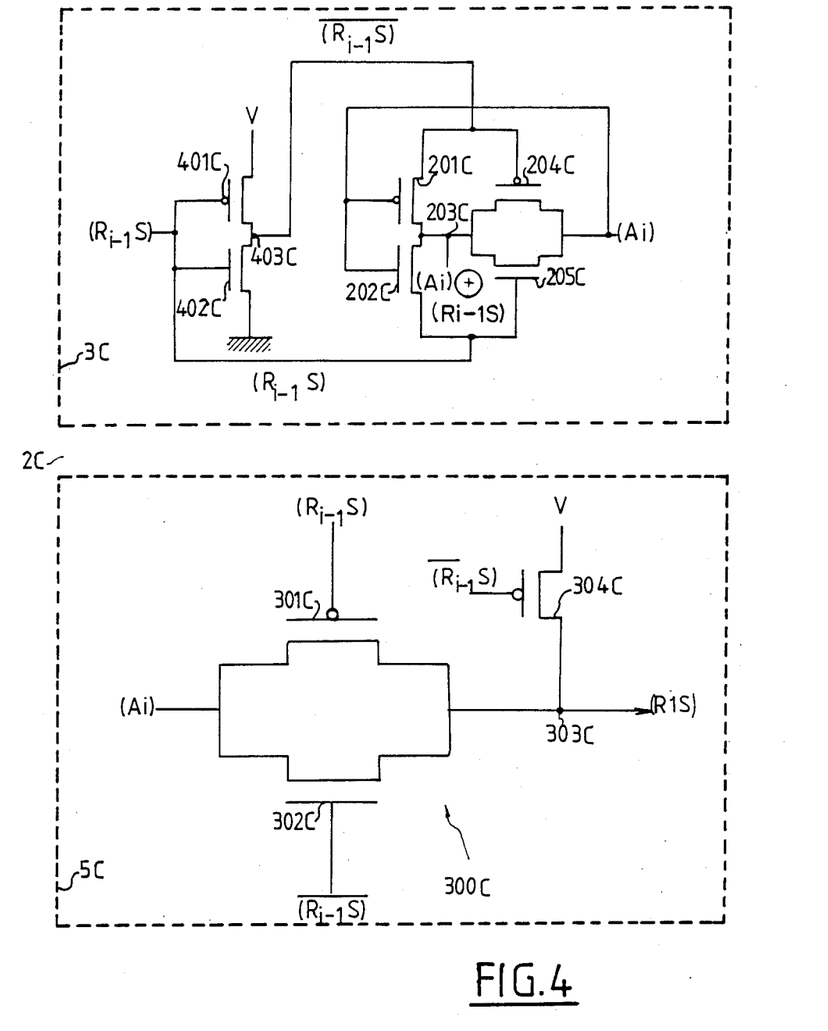
FIG. 4 is a circuit diagram of two modules of an addition cell in accordance with the invention for adding a bit (Ai) of arbitrary binary value to a bit of logic value "1"

Reference is now made to FIG. 4 which shows an addition cell 2C for adding a first bit (Ai) from the variable operand A of arbitrary binary value with a second bit (Bi) from the second operand B of fixed binary value equal to "1".

The cell 2C comprises a first module 3C for delivering an exclusive-OR signal ($A_i \oplus \overline{R_{i-1} S}$) between the first input signal and the carry-in signal, and a second module 5C for producing a carry-out signal ($R_i S$) by means of a transmission function comprising two transmission gates controlled by the carry-in signal ($R_{i-1} S$) and its complement ($\overline{R_{i-1} S}$), with one of the gates passing the variable or first input signal ($A_i$) and with the other gate passing the bit of the fixed operand of logic value "1".

The module 3C comprises a pair of transistors 401C and 402C which are respectively P-channel and N-channel. The grids of both transistors 401C and 402C are connected to the 1-bit carry-in input ($R_{i-1} S$). A positive electric voltage V is applied to the drain of transistor 401C, with ground being applied to the source of transistor 402C. The source of transistor 401C and the drain of transistor 402C are interconnected at the node 403C. The module 3C further includes a pair of transistors 201C and 202C which are respectively P-channel and N-channel. The drain of transistor 201C is connected to node 403C and the source of transistor 202C is connected to the 1-bit carry-in input ($R_{i-1} S$). The grids of both transistors 201C and 202C are connected to the 1-bit first input ($A_i$) from the variable operand A. The source of transistor 201C and the drain of transistor 202C are connected to the node 203C. The module 3C finally includes a pair of transistors 204C and 205C which are respectively P-channel and N-channel. The sources of both transistors 204C and 205C are connected to node 203C. The drains of both transistors 204C and 205C are connected to the 1-bit first input ($A_i$) from the variable operand A. The grid of transistor 204C is connected to node 403C and the grid of transistor 205C is connected to the 1-bit carry-in input ($R_{i-1} S$). The exclusive-OR signal between the bit of the operand A and the carry-in signal ($R_{i-1} S$) is obtained at node 203C.

Module 3C operates in exactly the same way as the means 450A and 200A described with reference to FIGS. 1 and 2.

The second module 5C of addition cell 2C includes a pair of transistors 301C and 302C which are respectively P-channel and N-channel. The grid of transistor 301C is connected to receive the carry-in signal ($R_{i-1} S$) and the grid of transistor 302C is connected to receive the complement of the carry-in signal ($\overline{R_{i-1} S}$). The drains of both transistors 301C and 302C are connected to receive the first input signal ($A_i$) from the variable operand A, and the sources of both transistors 301C and 302C are connected to a node 303C. The module 5C further includes a P-channel transistor 304C whose source is connected to a positive electric voltage V, whose grid is controlled by the complemented carry-in signal ($\overline{R_{i-1} S}$) and whose drain is connected to the node 303C. The carry-out signal ($R_i S$) is obtained at node 303C interconnecting the sources of both transistors 301C and 302C with the drain of transistor 304C.

Module 5C operates as follows: when the carry-in signal ($R_{i-1} S$) is in the low logic state the complemented carry-in signal ($\overline{R_{i-1} S}$) is in the high state. The transmission gate constituted by the transistors 301C and 302C is closed causing the signal ($A_i$) to appear at node 303C. The transmission gate constituted by transistor 304C is inactive.

When the carry-in signal ($R_{i-1} S$) is in the high logic state, its complement ($\overline{R_{i-1} S}$) is in the low logic state. The transmission gate constituted by transistor 304C is now closed, causing the signal at voltage V, i.e. the second input signal ($B_i$) of logic value "1" to appear at node 303C. The transmission gate constituted by the transistors 301C and 302C is inactive.

It may be observed that either of these two cells may be made from a single programmable circuit with the value taken by the fixed operand ($B_i$) depending on its metallization, i.e. on how the inputs to the single programmable circuit are connected.

Figure 5:
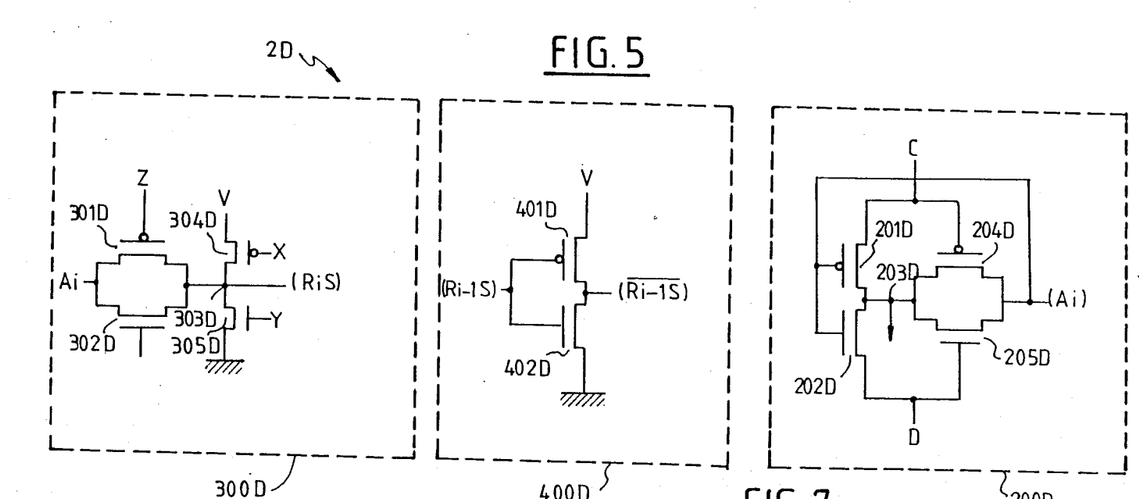
FIG. 5 is a diagram of a circuit in accordance with the invention capable of being configures as either of the cells described with reference to FIGS. 3 and 4, with its inputs being programmable as a function of the fixed operand B.

Reference is now made to FIG. 5 which illustrates how to program the inputs of such a single programmable circuit. This figure shows the three essential component parts of an adder, one of whose operands has a value which is fixed and known. Such a programmable input adder 2D uses the same essential parts as the preceding adders 2B and 2C, with equivalent references now being followed by a D. The means 300D are identical to the means 300A described with reference to FIG. 1. They differ only in the signals which are applied to the grids and to the drains of the transistors.

For a fixed operand of logic value equal to "0", the grid of transistor 304D receives an electric voltage of potential V (X=V). The grid of transistor 305D receives the complemented carry-in signal ($\overline{R_{i-1} S}$), (Y=($\overline{R_{i-1} S}$)). The grid of transistor 301D receives the complemented carry-in signal ($\overline{R_{i-1} S}$), (Z=($\overline{R_{i-1} S}$)). The grid of transistor 302D receives the carry-in signal ($R_{i-1} S$), (T=($R_{i-1} S$)). The drain of transistor 201D and the grid of transistor 204D receive the carry-in signal ($R_{i-1} S$), (C=($R_{i-1} S$)). The source of transistor 202D and the grid of transistor 205D receive the complemented carry-in signal ($\overline{R_{i-1} S}$), (D=($\overline{R_{i-1} S}$)).

For a fixed operand of logic value equal to "1", the grid of transistor 304D receives the complemented carry-in signal ($\overline{R_{i-1} S}$). The grid of transistor 305D is connected to ground. The grid of transistor 301D receives the carry-in signal ($R_{i-1} S$). The grid of transistor 302D receives the complemented carry-in signal ($\overline{R_{i-1} S}$). The drain of transistor 301D and the grid of transistor 304D receive the complemented carry-in signal ($\overline{R_{i-1} S}$). The source of transistor 302D and the grid of transistor 305D receive the carry-in signal ($R_{i-1} S$).

Figure 6:
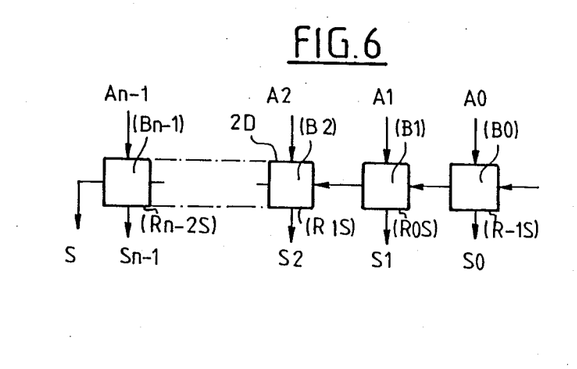
FIG. 6 is a block diagram of an adder in accordance with the invention in which the addition cells are hard-wired with the values of the bits of the fixed operand.

Reference is now made to FIG. 6 which shows an adder in accordance with the invention comprising a set of addition cells 2D connected in series. Each cell receives one of the bits ($A_i$), for $0 < i < n-1$, of the variable operand, i.e. one of the bits: $A_{n-1}, A_{n-2}, ..., A_0$.

Each cell 2D has a specific structure which is programmable during metallization and which is a function of the logic value of the known fixed bit ($B_i$), i.e. $B_{n-1}, B_{n-2}, ..., B_0$.

The adders 2B, 2C, and 2D as described above constitute a second type of embodiment of the invention. These adders may advantageously be used for constituting a binary multiplier for multiplying an operand of arbitrary value with an operand whose value is fixed and known. This constitutes a third type of embodiment of the invention.

Figure 7:
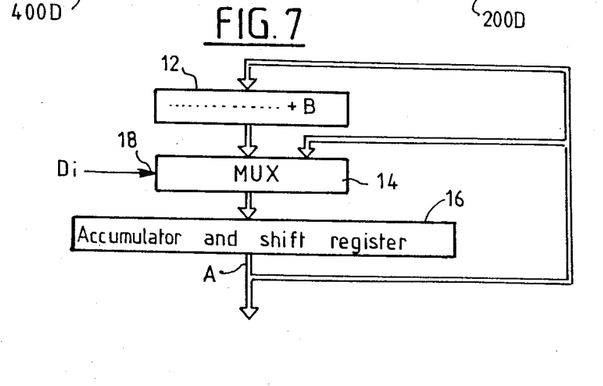
FIG. 7 is a diagram of the structure of a multiplier in accordance with the invention, said multiplier including an adder in accordance with FIG. 6.

Reference is now made to FIG. 7 which shows a binary multiplier in accordance with the invention. It comprises an adder 12 in accordance with the invention, a multiplexer 14, and an accumulator and shift register 16.

The items constituting the multiplier have parallel type inputs and outputs. The register 16 has an input and an output. The adder 12 has an input connected to the output of register 16, and it also has its own output. The adder 12 is as described with reference to FIG. 6 and it differs therefrom solely by the operand A being replaced by operand D. Thus, adder 12 comprises a first module delivering an exclusive-OR signal (Ai⊕Ri-1 S) and a second module delivering a carry-out signal (Ri S). The multiplexer 14 has two inputs, one of its inputs is connected to the output from the adder 12, and its other input is connected to the output from register 16. The output of multiplexer 14 is connected to the input of register 16. The fixed operand B is known and is specified by the structure of adder 12 as described with reference to FIGS. 3 to 6. The variable operand D is applied in serial form to a control input 18 of the multiplexer 14.

The multiplier in accordance with the invention operates as follows. At each clock pulse, the adder 12 adds the contents of shift register 16 with the fixed operand B. If the bit (Di) of rank i where $0 < i < n-1$, of the operand D applied to the input 18 of the multiplexer 14 is of value "0", the multiplexer 14 is controlled to select its input which is connected to the output of the register 16. The shift register 16 is thus reloaded with the same value as is contained at the preceding instant, but divided by 2 (shifted). In contrast, if the bit (Di) has the value "1", the multiplexer connects the input of register 16 to the output of adder 12. In this case, the shift register 16 is reloaded with the result delivered by adder 12.

In the embodiment shown in FIG. 7, the adder is capable solely of adding the contents of register 16 with the fixed operand B. If D is a negative number, i.e. ($Dn-1=1$), it is necessary to subtract the value B from the contents of register 16.

This cannot be done with the adder 12 of the multiplier shown in FIG. 7 since, by construction, it is capable of adding the single operand B only.

Figure 8:
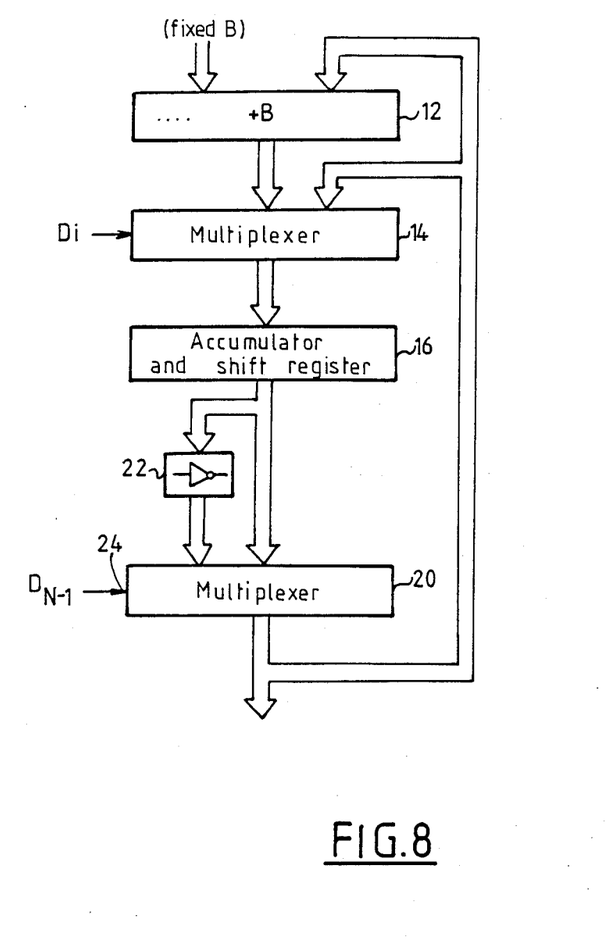
FIG. 8 shows a variant embodiment of the multiplier in accordance with the invention, for processing two operands of arbitrary sign.

In order to circumvent this difficulty, the FIG. 7 multiplier may be modified so as to be able to add in the fixed operand B with either sign. Such a modified multiplier is shown in FIG. 8.

In this multiplier, elements which are identical to those of the FIG. 7 multiplier have the same references. The FIG. 8 multiplier includes additional elements for inverting the contents of register 16. These means comprise an inverter 22 whose input receives the output from register 16 and a multiplexer 20 having a first input connected to the output of register 16 and a second input connected to receive the output from the inverter 22. The output from multiplexer 20 is connected to the input of adder 12. Multiplexer 20 includes a control input 24 for receiving the most significant bit $Dn-1$ of the serial operand D. The multiplexer 20 thus delivers to the input of adder 12, either the contents of register 16 if $Dn-1$ is equal to "0", or else the complemented contents of register 16 if $Dn-1$ is equal to "1". Adder 12 adds the value B to the contents of shift register 16 whose parity is thus determined by the multiplexer 20. The result of this sum (the complement of the contents of register 16+B) is complemented a second time in order to obtain the correct result (the contents of register 16−B).

We claim:

1. A binary complementary metal oxide semiconductor (CMOS) calculation cell, comprising:
a 1-bit first input for receiving a first input signal (Ai) of arbitrary binary value taken from a variable operand (A),
a 1-bit second input for receiving a second bit corresponding to a bit of logic value "1" and taken from a fixed operand (B),
a 1-bit carry-in input for receiving a carry-in input signal (Ri-1 S),
a logic inverter means connected to said carry-in input signal, for delivering the complement of said carry-in input signal,
a fist logic module for generating a first output bit, said first output bit being an exclusive-OR signal (Ai⊕Ri-1 S), representing the symmetrical exclusive-OR function of said first input signal and said carry-in input signal,
a second logic module for generating a carry-out output bit, said carry-out output bit being a logic symmetrical trigger function representing said first input signal depending upon the said carry-in input signal and complemented carry-in input signal, said second logic module further comprising:
  (i) a first pair of opposite polarity transistors forming a symmetrical source-to-drain arrangement and a symmetrical drain-to-source arrangement, with agate of a first transistor of the pair being connected to said carry-in input signal and a gate of a second transistor of the pair being connected to said complemented carry-in signal, said source-to-drain arrangement being connected to the first input bit, and said drain-to-source arrangement delivering said carry-out output bit, and
  (ii) a single transistor which is an N-channel transistor with its source connected to ground, with its gate controlled by said complemented carry-in input signal, and with its drain delivering said carry-out output bit,
a 1-bit first output for receiving said first output bit; and
a 1-bit second output for receiving said carry-out output bit.

2. A binary complementary MOS calculation cell according to claim 1, wherein the first logic module comprises three pairs of transistors as follows:
a first pair of opposite polarity transistors comprising a first transistor and a second transistor, with the gates of both transistors being connected to receive the carry-in signal (Ri-1 S), with a positive electric voltage (V) being applied to the drain of the first transistor, with ground being applied to the source of the second transistor, and with the source of the first transistor and the drain of the second transistor being interconnected at a first node;
a second pair of opposite polarity transistors comprising a first transistor and a second transistor, with the drain of the first transistor being connected to receive the carry-in signal (Ri-1 S), with the source of the second transistor being connected to the first node, with the gates of both transistors being connected to receive the first input signal (Ai) from the variable operand (A), and with the source of the first transistor and the drain of the second transistor being interconnected at a second node; and
a third pair of opposite polarity transistors, comprising a first transistor and a second transistor, with the sources of both transistors being connected to the second node, with the drains of both transistors being connected to receive the first input signal (Ai) from the variable operand, with the gate of the first transistor being connected to the carry-in input (Ri-1 S), and with the gate of the second transistor being connected to the first node, such that an exclusive-OR signal (Ai⊕Ri-1 S) between the bits of the variable operand (A) and the carry-in signal is obtained at the second node.

3. A binary complementary MOS calculation cell, having:

a 1-bit first input for receiving a first input signal (Ai) of arbitrary value taken from a variable operand, a 1-bit second input for receiving a second bit corresponding to a bit of logic value "0" and taken from a fixed operand (B), a 1-bit carry-in input for receiving a carry-in input signal (Ri-1 S), a logic inverter means connected to said carry-in input signal, for delivering the complement of said carry-in input signal, a first logic module for generating a first output bit said first output bit being the an exclusive-OR signal (Ai⊕Ri-1 S), representing symmetrical exclusive-OR function of said first input signal and said carry-in input signal, a second logic module for generating a carry-out output said carry-out output being a logic symmetrical trigger function representing said first input signal depending upon both said carry-in input signal and said complemented carry-in input, said second logic module further comprising:

(i) a first pair of opposite polarity transistors forming a symmetrical source-to-drain arrangement and a symmetrical drain-to-source arrangement, with a gate of a first transistor of the pair being connected to said carry-in input signal and a gate of a second transistor of the pair being connected to said complemented carry-in signal, said source-to-drain arrangement being connected to the first input bit, and said drain-to-source arrangement delivering said carry-out output bit, and (ii) a single transistor which is an P-channel transistor with its source connected to a positive electric voltage (V), with its gate controlled by said complemented carry-in input signal, and with its drain delivering said carry-out output bit, a 1-bit first output for receiving said first output bit; and a 1-bit second output for receiving said carry-out output bit.

4. A binary complementary MOS calculation ell according to claim 3, wherein the first logic module comprises three pairs of transistors as follows:

a first pair of opposite polarity transistors comprising a first transistor and a second transistor, with the gates of both transistors being connected to receive the carry-in signal (Ri-1 S), with a positive electric voltage (V) being applied to the drain of the first transistor, with ground being applied to the source of the second transistor, and with the source of the first transistor and the drain of the second transistor being interconnected at a first node;

a second pair of opposite polarity transistors, comprising a first transistor and a second transistor, with the drain of the first transistor being connected to the first node, with the source of the second transistor being connected to receive the carry-in signal (Ri-1 S), with the gates of both transistors being connected to receive the fist input signal (Ai) from the variable operand (A), and with the source of the first transistor and the drain of the second transistor being interconnected at a second node; and a third pair of opposite polarity transistors, comprising a first transistor and a second transistor, with the sources of both transistors being connected to the second node, with the drains of the both transistors being connected to receive the first input signal (Ai) from the variable operand (A), with the gate of the first transistor being connected to receive the carry-in signal (Ri-1 S), such that an exclusive-OR signal (Ai⊕Ri-1 S) between the bits of the variable operand (A) and the carry-in signal is obtained at the second node.

5. A binary calculation circuit comprising a plurality of complementary metal oxide semiconductor cells having a 1-bit first input for receiving a first input signal (Ai) of arbitrary binary value taken from a variable operand (A), a 1-bit second input for receiving a second bit corresponding to a bit of logic value "1" and taken from a fixed operand (B), a 1-bit carry-in input for receiving a carry-in input signal (Ri-1 S), a logic inverter means connected to said carry-in input signal, for delivering the complement of said carry-in input signal, a first logic module for generating a first output bit, said first output bit being an exclusive-OR signal (Ai⊕Ri-1 S), representing the symmetrical exclusive-OR function of said first input signal and said carry-in input signal, a second logic module for generating a carry-out output bit, said carry-out output bit being a logic symmetrical rigger function representing said first input signal depending upon both said carry-in input signal and complemented carry-in input signal, said second logic module further comprising:

(i) a first pair of opposite polarity transistors forming a symmetrical source-to-drain arrangement and a symmetrical drain-to-source arrangement, with a gate of a first transistor of the pair being connected to said carry-in input signal and a gate of a second transistor of the pair being connected to said complemented carry-in signal, said source-to-drain arrangement being connected to the first input bit, and said drain-to-source arrangement delivering said carry-out output bit, and (ii) a single transistor which is an N-channel transistor with its source connected to ground, with its gate controlled by said complemented carry-in input signal, and with its drain delivering said carry-out output bit, a 1-bit first output for receiving said first output bit, and a 1-bit second output for receiving said carry-out output bit, and in which a carry-out bit (Ri S) from each cell rank (i) (0<i<n−2) is connected to a carry-in input (R(i+1)-1 S) of a cell of rank (i+1) and wherein each cell is hardwired for its value of bit (Bi) from the fixed operand (B).

6. A binary calculation circuit comprising a plurality of complementary metal oxide semiconductor cells having a 1-bit first input for receiving a first input signal (Ai) of arbitrary value taken from a variable operand, a 1-bit second input for receiving a second bit corresponding to a bit of logic value "0" and taken from a fixed operand (B), a 1-bit carry-in input for receiving a carry-in input signal (Ri-1 S), a logic inverter means connected to said carry-in input signal, for delivering the complement of said carry-in input signal, a first logic module for generating a first output bit said first output bit being the an exclusive-OR signal (Ai⊕Ri-1 S), representing symmetrical exclusive-OR function of said first input signal and said carry-in input signal, a second logic module for generating a carry-out output said carry-out output being a logic symmetrical trigger function representing said first input signal depending upon the said carry-in input signal and said complemented carry-in input, said second logic module further comprising:

(i) a first pair of opposite polarity transistors forming a symmetrical source-to-drain arrangement and a symmetrical drain-to-source arrangement, with a gate of a first transistor of the pair being connected to said carry-in input signal and a gate of a second transistor of the pair being connected to said complemented carry-in signal, said source-to-drain arrangement being connected to the first input bit, and said drain-to-source arrangement delivering said carry-out output bit, and (ii) a single transistor which is an P-channel transistor with its source connected to a positive electric voltage (V), with its gate controlled by said complemented carry-in input signal, and with its drain delivering said carry-out output bit, a 1-bit first output for receiving said first output bit, and a 1-bit second output for receiving said carry-out bit, and in which a carry-out bit (Ri S) from each cell of rank (i) ($0<i<n-2$) is connected to a carry-in input (R(i+1)-1 S) of a cell of rank (i+1), wherein each cell is hard-wired for its value of bit (Bi) from the fixed operand (B).

* * * * *